(12) United States Patent
Ives

(10) Patent No.: X9675
(45) Date of Patent: May 23, 1836

(54) SPRING, FOR CLOCKS

(76) Inventor: James S. Ives

Joseph Ives Bristol Con:

Letters Patent.

The Schedule referred to in these Letters Patent and making part of the same containing a description in the words of the said Joseph Ives himself of his improvement in the Brass or composition Main Spring for Clocks.

To all persons to whom these presents shall come Joseph Ives of Bristol in the County of Hartford and State of Connecticut sends Greeting Be it known that I the said Joseph Ives have invented constructed made and applied to use a new and useful improvement in the making and construction of Main Springs for clocks propelled or moved by main Springs called a Brass or composition metal main Spring for Clocks. This improvement consists in substituting [illegible] brass or composition metal in making main springs for Clocks instead of Steel. that is the main Springs are made of brass or composition metal instead of Steel as heretofore and now used for such main springs. The main springs are made in the same shape and form as Steel ones, only brass or composition metal is substituted for Steel. The Inventor has made use of brass only in making such main springs but he considers and contemplates that other composition metals may be used for that purpose. He does not claim the Invention of main Springs for Clocks, but the application of brass or composition metal instead of Steel for such Main Springs and for this he claims a patent. The advantage and benefit of this improvement is that main springs can be made much easier and Cheaper of Brass or other like metal than of Steel, and equally as good In testimony that the above is a true specification of my said improvement as above described I have

United States Patent

Patent No.: X9675

In witness whereof I set my hand this second day of March one thousand eight hundred and thirty six Witnesses)
Calvin Butler
Elisha C. Brewster Joseph Smith (352 words)